US012617239B2

(12) United States Patent
Rittweger et al.

(10) Patent No.: US 12,617,239 B2
(45) Date of Patent: May 5, 2026

(54) PNEUMATIC TIRE FOR A VEHICLE

(71) Applicant: Continental Reifen Deutschland GmbH, Hannover (DE)

(72) Inventors: Stefan Rittweger, Garbsen (DE); Juraj Jurco, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 97 days.

(21) Appl. No.: 18/255,787

(22) PCT Filed: Nov. 25, 2021

(86) PCT No.: PCT/DE2021/200202
§ 371 (c)(1),
(2) Date: Jun. 2, 2023

(87) PCT Pub. No.: WO2022/117164
PCT Pub. Date: Jun. 9, 2022

(65) Prior Publication Data
US 2024/0051346 A1      Feb. 15, 2024

(30) Foreign Application Priority Data

Dec. 2, 2020      (DE) ..................... 10 2020 215 188.1

(51) Int. Cl.
| | |
|---|---|
| *B60C 13/00* | (2006.01) |
| *B60C 3/04* | (2006.01) |
| *B60C 11/03* | (2006.01) |

(52) U.S. Cl.
CPC ............ *B60C 11/0318* (2013.01); *B60C 3/04* (2013.01); *B60C 13/001* (2013.01)

(58) Field of Classification Search
CPC ..... B60C 11/0318; B60C 3/04; B60C 13/001; B60C 13/002; B60C 13/02
See application file for complete search history.

(56) References Cited

U.S. PATENT DOCUMENTS

| | | | |
|---|---|---|---|
| 6,121,574 A | 9/2000 | Xu | |
| 2008/0283169 A1* | 11/2008 | Sato | ..................... B60C 13/001 |
| | | | 152/450 |

(Continued)

FOREIGN PATENT DOCUMENTS

| | | |
|---|---|---|
| DE | 102013223567 A1 | 4/2015 |
| DE | 202014010855 U1 | 11/2016 |

(Continued)

OTHER PUBLICATIONS

Desvignes, English Machine Translation of FR 3075099, 2019 (Year: 2019).*

(Continued)

*Primary Examiner* — Katelyn W Smith
*Assistant Examiner* — Brendon Charles Darby
(74) *Attorney, Agent, or Firm* — Richard A. Wolf; Gregory Adams

(57) ABSTRACT

A pneumatic tire for a vehicle, having at least one surface element that is formed on the outer surface of the tire and has a structure which contrasts with a base level and gives the surface element a roughness. The contrast structure is formed by a multiplicity of contrast structure cells, which coincide in shape in plan view and are joined together in the form of a grid. The contrast structure cells have irregular peak and trough structures of a surface-covering configuration. The arrangement of the contrast structure cells and the configuration of the irregular peak and trough structures are such that, when considered in plan view, the irregular peak and trough structures can be transferred one into the other by congruence mapping.

8 Claims, 3 Drawing Sheets

(56) References Cited

U.S. PATENT DOCUMENTS

Figure 1:
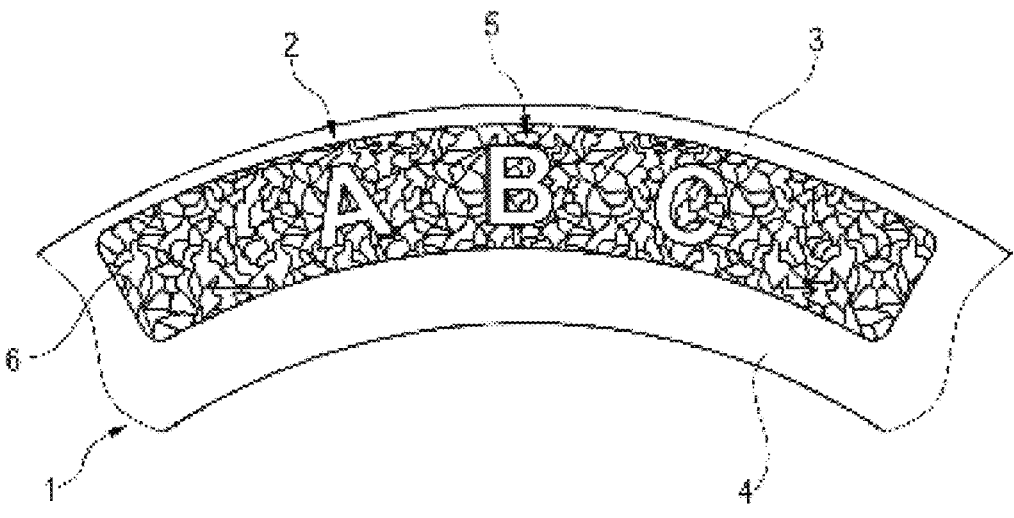

| | | | |
|---|---|---|---|
| 2009/0218019 A1 | 9/2009 | Paturle | |
| 2012/0227879 A1 | 9/2012 | Muhlhoff et al. | |
| 2013/0032265 A1* | 2/2013 | Kouda | B60C 13/001 |
| | | | 152/523 |
| 2014/0166177 A1* | 6/2014 | Muhlhoff | B29D 30/72 |
| | | | 152/523 |
| 2020/0070591 A1* | 3/2020 | Debordeaux | B60C 13/001 |

FOREIGN PATENT DOCUMENTS

| | | | |
|---|---|---|---|
| EP | 2905125 A1 | 8/2015 | |
| EP | 3680113 A1 | 7/2020 | |
| EP | 4255741 B1 | 1/2025 | |
| FR | 3075099 A1 | 6/2019 | |
| FR | 3079168 A1 | 9/2019 | |
| JP | 2013233854 A * | 11/2013 | |
| WO | 2022117164 A1 | 6/2022 | |

OTHER PUBLICATIONS

Kiyono, English Machine Translation of JP 2013233854, 2013 (Year: 2013).*

International Search Report dated Feb. 16, 2022 of International Application PCT/DE2021/200202 on which this application is based.

Karrach et al., LADISLAV, Identification of QR Code Perspective Distortion Based on Edge Directions and Edge Projections Analysis, Journal of Imagining, Jul. 10, 2020.

Wikipedia, Auflösungsvermögen, Fundstelle: https://web.archive.org, extracted on Oct. 4, 2025, Jan. 9, 2020.

The University of Waikato, Resolving power of microscopes, https://www.schiencelearn.org.nz/documents/723-resolving-power-of-microscopes, 2018.

EP Opposition dated Oct. 15, 2025 of counterpart European Application 21820108.5.

* cited by examiner

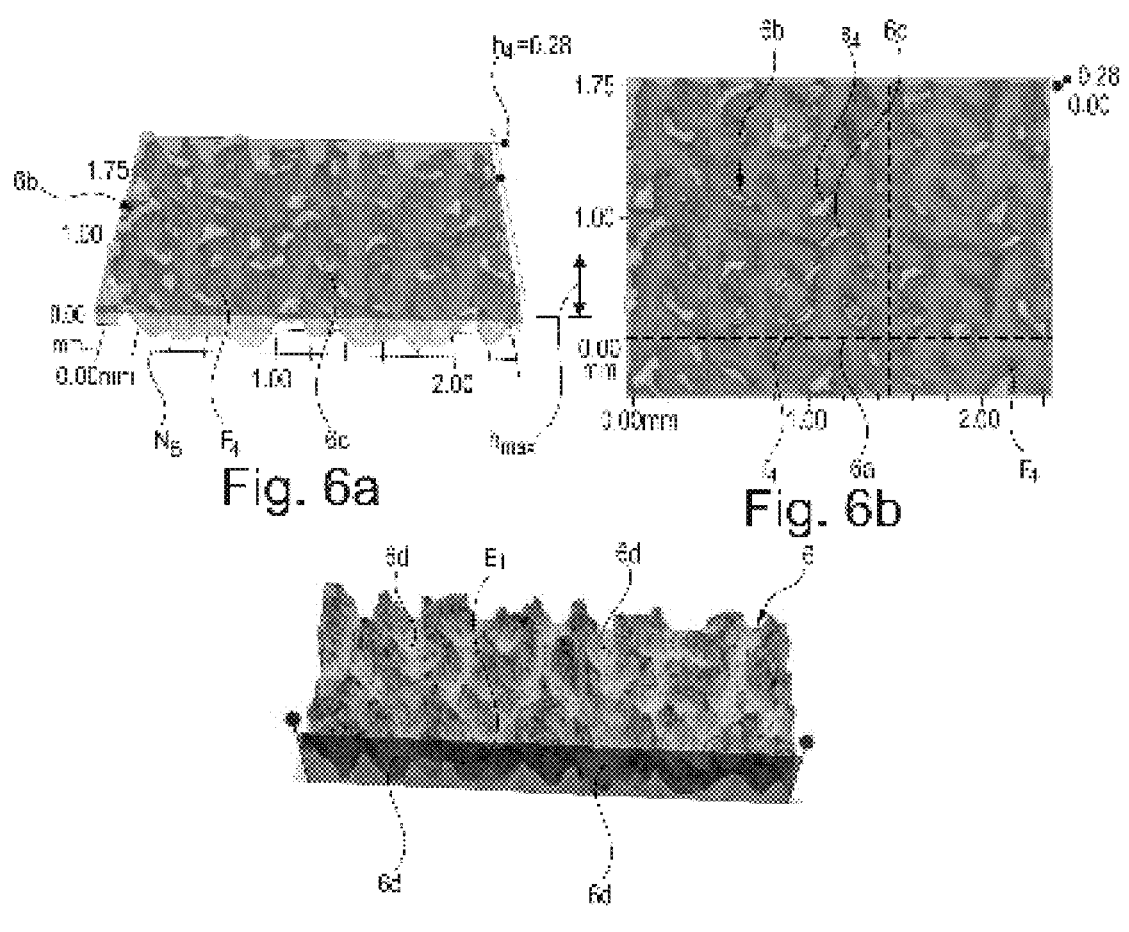
Fig. 6a
Fig. 6b
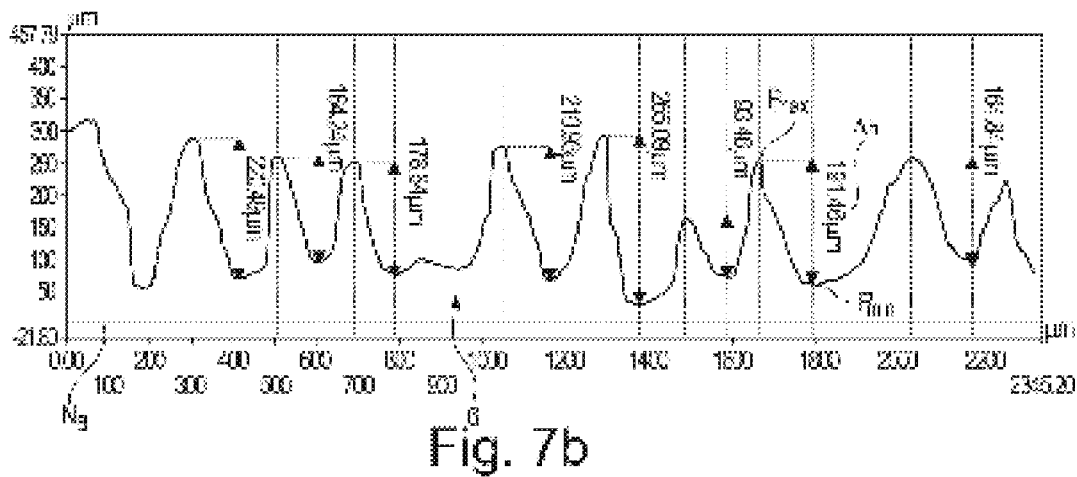
Fig. 7a
Fig. 7b

PNEUMATIC TIRE FOR A VEHICLE

The invention relates to a pneumatic tire for a vehicle having formed on its outer surface at least one surface element with a structure that contrasts with a base level which imparts a roughness to the surface element.

A tire of the type stated at the outset is known from FR 3 075 099 A1, for example. The tire has a tread and sidewalls, wherein at least one surface element with a contrast structure is formed on the tread and/or on at least one sidewall. The contrast structure has a plurality of peaks formed in an irregular manner at a density of at least one peak per square millimeter. More preferably, the peaks are formed in a density of at most 100 peaks per square millimeter. The peaks have a height of 50 μm to 600 μm, preferably of 100 μm to 400 μm, particularly preferably of 200 μm to 350 μm. This contrast structure is intended to provide a good contrast effect regardless of the viewing angle.

A rubber article, for example a tire, is known from DE 20 2014 010 855 U1, on the outer surface of which there is formed a surface element with a contrast structure. The contrast structure has at least one first surface part and at least one second surface part, wherein the reflectance of the first surface part is greater than that of the second surface part. The surface parts are parts of a digital code pattern.

DE 10 2013 223 567 A1 discloses a pneumatic tire for a vehicle, one sidewall of which has an optoelectronically readable code. The code is formed by cells of two different cell types. The cells have a surface profile, wherein the surface profiles are such that the reflection properties of one cell type differ from those of the other cell type.

It is therefore known that surface elements having a contrast structure can be formed on the outer surface of pneumatic tires for vehicles, in particular on sidewalls, said surface elements primarily having the task of creating a contrast with other surface regions, in particular unstructured surface regions, in order in this way, for example, to make it easier to distinguish symbols on the sidewalls, e.g. design elements or logos. Surface elements having contrast structures make this possible since—in comparison with smooth surfaces—they reflect less light, that is to say "capture" incident light and therefore appear darker to the observer than smooth surface regions.

In particular, uniform contrast structures consisting of a large number of ribs running parallel to one another are known. Furthermore, irregular contrast structures consisting of "finer" structures—compared to the ribs—i.e. significantly smaller, point-like elevations and/or hole-shaped depressions are known, which are produced in particular by laser engraving of the molded parts.

When designing ribs forming uniform contrast structures, the orientation of the ribs must be adapted to the shape of the particular surface element in order to achieve a sufficiently good contrast effect. Due to the parallel arrangement of the ribs, the ribs reflect more light at certain viewing angles, while they in turn reflect little to hardly any light at certain other viewing angles, so that the contrast effect is not optimal in this respect.

Irregular contrast structures can be used much more flexibly than ribs and show a more uniform, largely direction-independent light reflection. However, the creation of completely irregular contrast structures on large surface areas, as is desirable or necessary on the sidewalls of tires, for example, is only possible with very complex laser engraving.

The object of the invention is therefore to provide, in a tire of the type mentioned at the outset, a contrast structure of which the size is easily scalable and of which the contrast effect is at least largely independent of direction.

The stated object is achieved according to the invention in that the contrast structure is formed by a multiplicity of contrast structure cells, which coincide in shape in plan view and are joined together in the form of a grid, wherein the contrast structure cells have irregular peak and trough structures of a surface-covering configuration, wherein the arrangement of the contrast structure cells and the configuration of the irregular peak and trough structures are such that the irregular peak and trough structures, when considered in plan view, can be transferred one into the other by congruence mapping.

By repeating or duplicating such a contrast structure cell, the contrast structure can be scaled to any size and is therefore excellently suited for surface areas of different sizes. In particular, large-area surface elements with a contrast structure having the advantages of a completely irregular structure can be made available in a simple manner, for example on the sidewalls of vehicle tires. Since the repetition is recognizable at most at a very short distance, an excellent contrast effect is ensured for the observer.

According to a preferred embodiment, the peak and trough structures, when considered in plan view, can be transferred one into the other by parallel displacement of the contrast structure cells.

According to a further preferred embodiment, the contrast structure cells in plan view have the shape of rectangles, in particular squares, or hexagons, in particular regular hexagons. Such contrast structure cells make it particularly easy to scale the size of the contrast structure. Expediently, such contrast structure cells—in the case of appropriately designed, irregular peak and trough structures—can be arranged in a simple manner in such a way that the contrast structure cells can be transferred into one another by parallel displacement.

With regard to scaling the size of the contrast structure, it is further advantageous if the contrast structure cells have an edge length of 0.8 mm to 1.5 mm, in particular of up to 1.2 mm, preferably of 1.0 mm.

A further improvement of the contrast effect can be achieved with combinable preferred embodiments, which have a defined positive portion of the irregular peak and trough structures, as presented below.

A first of these preferred embodiments is characterized in that the peak and trough structure of each contrast structure cell with a height surface region, extending over the region of the contrast structure cell, of a first height surface which extends parallel to the base level of the contrast structure and, with respect thereto, lies at a height of 80 μm, has a single- or multi-part sectional surface which occupies 80% to 90% of the height surface region.

A second of these preferred embodiments is characterized in that the peak and trough structure of each contrast structure cell with a height surface region, extending over the region of the contrast structure cell, of a second height surface which extends parallel to the base level of the contrast structure and, with respect thereto, lies at a height of 150 μm, has a single- or multi-part sectional surface which occupies 40% to 60% of the height surface region.

A third of these preferred embodiments is characterized in that the peak and trough structure of each contrast structure cell with a height surface region, extending over the region of the contrast structure cell, of a third height surface which extends parallel to the base level of the contrast structure and, with respect thereto, lies at a height of 200 μm, has a single- or multi-part sectional surface which occupies 20% to 40% of the height surface region.

A fourth of these preferred embodiments is characterized in that the peak and trough structure of each contrast structure cell with a height surface region, extending over the region of the contrast structure cell, of a fourth height surface which extends parallel to the base level of the contrast structure and, with respect thereto, lies at a height of 280 μm, has a single- or multi-part sectional surface which occupies 10% to 20% of the height surface region.

In the fourth preferred embodiment, it is advantageous if the height surface regions of the fourth height surface separate peak regions from the other peak and trough structure, wherein up to five, in particular up to three, peak regions sit on each height surface region and preferably have, at their highest points, a height, determined with respect to and perpendicular to the base level, of 300 μm to 350 μm.

With regard to the contrast effect, it is particularly favorable if the peak and trough structure of each contrast structure cell with height surface regions which extend over the region of the contrast structure cell and which belong to height surfaces extending parallel to the base level of the contrast structure has, in each case, a single- or multi-part sectional surface, wherein a first height surface with respect to the base level lies at a height of 80 μm, a second height surface with respect to the base level lies at a height of 150 μm, a third height surface with respect to the base level lies at a height of 200 μm, and a fourth height surface with respect to the base level lies at a height of 280 μm, wherein the following relationships apply:

a) size of the sectional surface with the height surface region of the fourth height surface≤0.7×the size of the sectional surface with the height surface region of the third height surface, b) size of the sectional surface with the height surface region of the third height surface≤0.7×the size of the sectional surface with the height surface region of the second height surface, and c) size of the sectional surface with the height surface region of the second height surface≤0.7×the size of the sectional surface with the height surface region of the first height surface.

According to a further preferred embodiment, the contrast structure, along the mutual connection points of the contrast structure cells, has trough structures so that the grid pattern of the contrast structure is visible to the naked eye.

Such trough structures, starting from a side, facing away from the base level, of a height surface which, with respect to the base level, lies at a height of 150 μm, preferably have a width of at least 0.1 mm.

According to a further preferred embodiment, the contrast structure has smooth transitions of peak and trough structures between the contrast structure cells, so that the grid pattern of the contrast structure is not visible to the naked eye.

According to a further preferred embodiment, the contrast structure, in each plane arranged perpendicular to the base level, has a height profile with multiple local maxima and local minima arranged successively in alternation, wherein a height difference of 80 μm to 300 μm, measured perpendicular to the base level, exists between each local minimum and each of the two directly adjacent local maxima. This measure helps to further improve the contrast effect of the contrast structure.

In this embodiment, it is of additional advantage if local minima and adjacent local maxima are provided, between which the height difference is at least 100 μm, preferably at least 150 μm.

Figure 2:
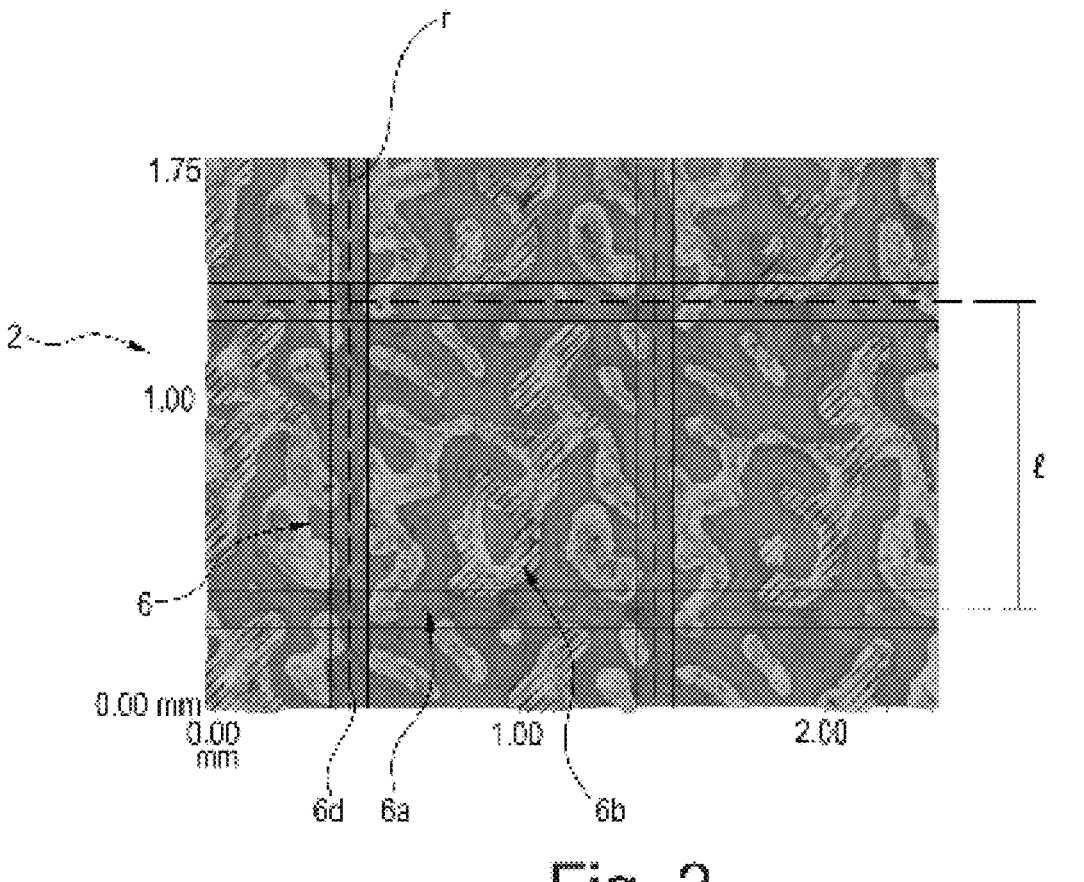
Figures 3A, 3B, 4A, 4B, 5A, 5B:
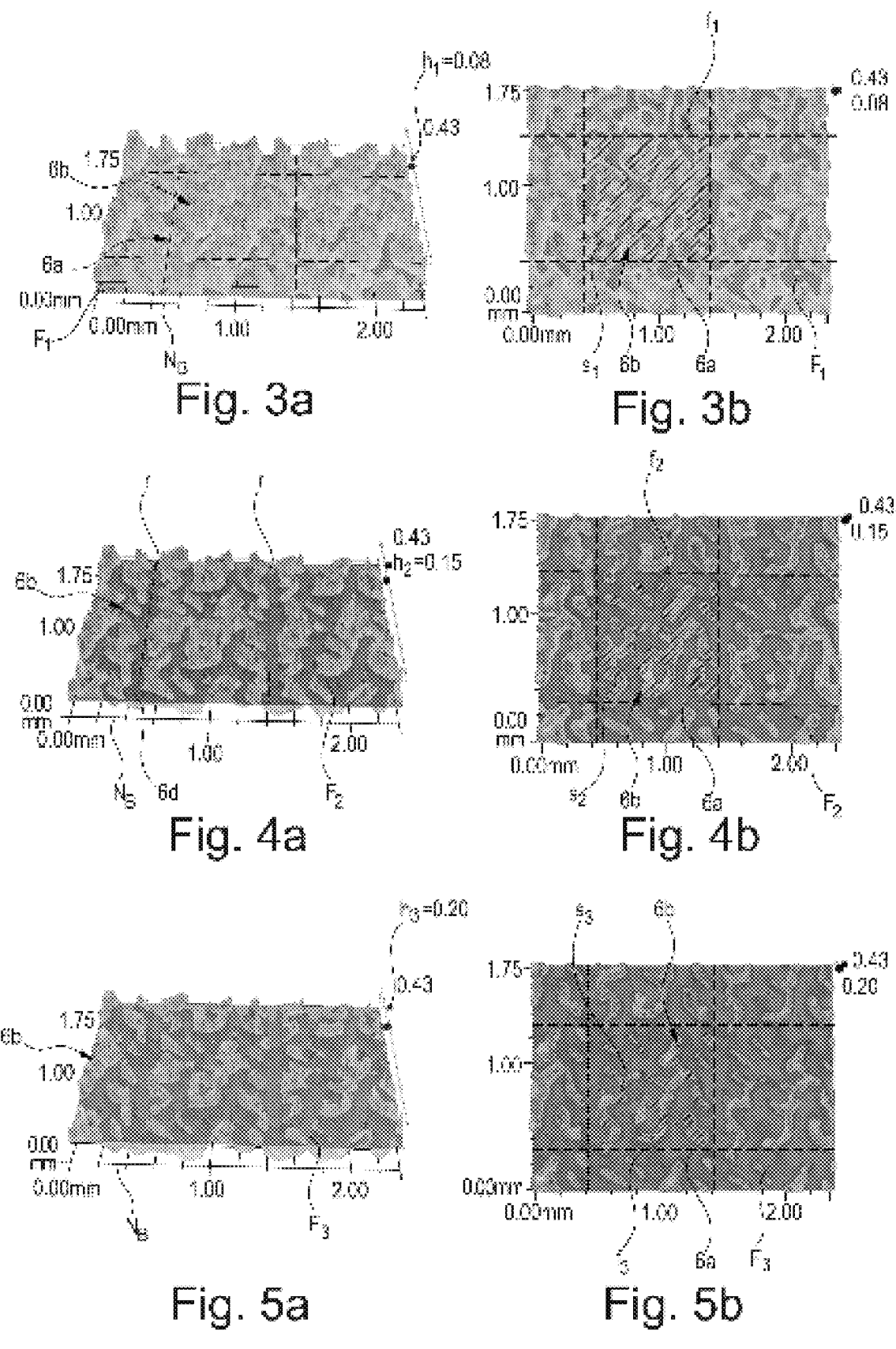

Further features, advantages and details of the invention will now be described in more detail with reference to the drawing, which schematically shows an exemplary embodiment of the invention. In the drawing:

FIG. 1 shows a schematic plan view of a circumferential portion of a sidewall of a pneumatic tire for a vehicle with a design variant of the invention, FIG. 2 shows a plan view of a micrograph in the region of a surface element situated on the sidewall, FIG. 3a and FIG. 3b show views of the micrograph from FIG. 2, wherein a first height surface is drawn in each case, FIG. 4a and FIG. 4b show views analogous to FIG. 3a and FIG. 3b, wherein a second height surface is drawn in each case, FIG. 5a and FIG. 5b show further views analogous to FIG. 3a and FIG. 3b, wherein a third height surface is drawn in each case, FIG. 6a and FIG. 6b show further views analogous to FIG. 3a and FIG. 3b, wherein a fourth height surface is drawn, FIG. 7a shows an oblique view of a portion of the micrograph from FIG. 2, wherein the micrograph is sliced along a plane E1, and FIG. 7b shows a height profile of the micrograph in the plane E1 from FIG. 7a.

The invention is concerned with surface elements which are formed on the outer surface of pneumatic tires for vehicles and have a special contrast structure.

The surface elements are formed on the outer surface in a region which does not come into contact with the ground or does not come into surface contact with the ground when the pneumatic tire for a vehicle is in use, in particular on sidewalls, on the tread edge, i.e. on the shoulder flanks running outside the ground contact area to the sidewalls, or on groove flanks and/or groove bottoms of grooves running in the tread. As a particular preference, the surface elements are formed on a sidewall. Sidewalls of pneumatic tires for vehicles generally include symbols which represent the prescribed information, such as dimensional information, the speed index, the manufacturer or the purpose (summer/winter tires), or other symbols, such as logos or design elements. The surface elements having a special contrast structure can surround the symbols mentioned on the sidewall and/or can themselves form the symbols.

The surface elements can also be formed on the tread, i.e. on that region of the outer surface of the tread which comes into contact with the ground when the pneumatic tire for a vehicle is in use.

The level with respect to which the contrast structure of the surface elements is formed on the tire is referred to below as the base level $N_B$. The base level $N_B$ is the level from which the positives of the contrast structure are raised, as explained below.

The contrast structure is preferably formed in the course of vulcanization of the pneumatic tire for a vehicle. The mold segment(s) of the vulcanization mold, for example the side shells, is/are provided with a laser engraving corresponding to the contrast structure. The contrast structure is therefore a positive of the laser engraving and thus a positive with respect to the base level $N_B$. For example, if a side shell is directly provided with a laser engraving, the level of the sidewall is the base level $N_B$. For example, if an elevation formed on the side shell is provided with a laser engraving, the base level $N_B$ is the level of the bottom of a shallow depression formed on the sidewall.

Alternatively, the contrast structure can be laser engraved on the finished vulcanized tire. The resulting base level $N_B$ is thus offset towards the inside of the tire with respect to the non-engraved level surrounding the base level.

FIG. 1 shows a schematic illustration, projected into the plane, of a circumferential portion of a sidewall 1 with a surface element 2 which has substantially the form of a portion of a circular ring. A tread edge 3 and an outer bead region 4, which is at least partially covered by a rim when the tire is mounted on the rim, are additionally indicated in FIG. 1. The surface element 2 surrounds lettering 5, the letters A B C of which have a smooth surface. The lettering 5 is thus not part of the surface element 2.

FIG. 2 shows a plan view of a micrograph of a partial region of the surface element 2, wherein a square grid (square lattice) with grid lines r is drawn in. In FIG. 3a to FIG. 6a, the base level $N_B$ is indicated in each case by grid lines.

The surface element 2 is provided over the full area, i.e. over its entire extent, with a three-dimensional contrast structure 6 (FIG. 1), which imparts roughness, i.e. unevenness, to the surface element 2 (FIG. 3a to FIG. 6a). As indicated in FIG. 2 by the aforementioned square grid, the contrast structure 6 in the exemplary embodiment is composed of a plurality of contrast structure cells 6a which adjoin one another in a checkerboard fashion, are square in plan view with respect to their outer circumference, and are designed to be substantially coincident. The contrast structure cells 6a have an edge length l of 0.8 mm to 1.5 mm, in the exemplary embodiment of 1.0 mm, wherein in FIG. 2 only a single contrast structure cell 6a can be seen completely and partial regions of eight contrast structure cells 6a adjacent thereto.

The term "contrast structure cells 6a designed to be substantially coincident" means, on the one hand, those which have been generated (engraved) in a "coincident" manner directly on the outer surface of the tire (in the exemplary embodiment, on the sidewall) by means of a software-controlled laser. On the other hand, "contrast structure cells 6a designed to be substantially coincident" are understood to be those which were generated in the course of vulcanization by a corresponding laser engraving located on the inside of the mold segment (in the exemplary embodiment, the side shell), wherein the laser engraving comprises a plurality of engraving regions which adjoin one another and which were each generated in a "coincident" manner by means of a software-controlled laser. Due to the melting and evaporation processes occurring during laser engraving, it is not possible to produce identical (100% coincident) contrast structure cells 6a on the outer surface of pneumatic tires for vehicles using the methods currently available. This applies both to contrast structure cells 6a produced indirectly by laser engraving of the molded parts and to contrast structure cells 6a produced directly by laser engraving of the vulcanized rubber material. The term "substantially coincident" therefore refers to deviations occurring within the technical tolerance limits of the production process (software-controlled laser engraving).

As shown in particular in FIG. 2 in combination with FIG. 3a, each contrast structure cell 6a has an irregular peak and trough structure 6b, which is formed in an area-covering manner, and therefore over the entire contrast structure cell

6a, and has irregular peak structures with peak ridges and peak saddles as well as irregular trough structures, wherein both the peak structures and the trough structures run over different levels relative to the base level $N_B$ or are located at different levels. As has already been mentioned, the contrast structure cells 6a are substantially coincident, such that they have substantially coincident irregular peak and trough structures 6b. The irregular peak and trough structures 6b, as seen in plan view, are transferable into each other by (twist-free) parallel displacement of the contrast structure cells 6a. To illustrate this fact, in FIG. 2 in each contrast structure cell 6a the "same" partial region of a peak structure or the part of this partial region to be seen is provided with a hatching.

The further shape of the contrast structure cells 6a is explained below with the aid of height surfaces $F_1$, $F_2$, $F_3$ and $F_4$ (FIG. 3a to FIG. 6a, FIG. 3b to FIG. 6b). The height surfaces $F_1$, $F_2$, $F_3$ and $F_4$ extend parallel to the base level $N_B$, and intersect the irregular peak and trough structure 6b at various heights $h_1$ (height surface $F_1$, FIG. 3a), $h_2$ (height surface $F_2$, FIG. 4a), $h_3$ (height surface $F_3$, FIG. 5a) and $h_4$ (height surface $F_4$, FIG. 6a) determined perpendicular with respect to the base level $N_B$. Height $h_1$ is 80 µm, height $h_2$ is 150 µm, height $h_3$ is 200 µm, and height $h_4$ is 280 µm. In each contrast structure cell 6a, the height surfaces $F_1$, $F_2$, $F_3$ and $F_4$—corresponding to the size of a contrast structure cell 6a—have a 1 cm×1 cm height surface region $f_1$, $f_2$, $f_3$, $f_4$ (FIG. 3b to FIG. 6b). In each contrast structure cell 6a, the irregular peak and trough structure 6b with the associated height surface region $f_1$, $f_2$, $f_3$, $f_4$ has, in each case, a single-part or multi-part sectional surface $s_1$, $s_2$, $s_3$, $s_4$ (FIG. 3b to FIG. 6b), which is part of the height surface region $f_1$, $f_2$, $f_3$, $f_4$ and which is provided with a hatching in FIG. 3b to FIG. 6b. In the region of each sectional surface $s_1$, $s_2$, $s_3$, $s_4$, the height surface region $f_1$, $f_2$, $f_3$, $f_4$ is penetrated by the irregular peak and trough structure 6b (compare FIG. 3a to FIG. 6a). The sectional surface $s_1$ occupies 80% to 90% of the height surface region $f_1$ (FIG. 3b), the sectional surface $s_2$ occupies 40% to 60% of the height surface region $f_2$ (FIG. 4b), the sectional surface $s_3$ occupies 20% to 40% of the height surface region $f_3$ (FIG. 5b), and the sectional surface $s_4$ occupies 10% to 20% of the height surface region $f_4$ (FIG. 6b). Here, the relationship $s_4 < s_3 < s_2 < s_1$ applies. More preferably, the relationships $s_4 \leq 0.7 \, s_3$, $s_3 \leq 0.7 \, s_2$ and $s_2 \leq 0.7 \, s_1$ also apply.

As FIG. 6a and FIG. 6b show, each height surface region $f_4$ separates peak regions 6c from the rest of the peak and trough structure 6b, i.e. from the region of the peak and trough structure 6b "below" the respective height surface region $f_4$. In this context, a peak region 6c is a contiguous peak region of the peak and trough structure 6b which "sits" on, i.e. is adjacent to, the height surface region $f_4$ or the height surface $F_4$. Within the contrast structure cell 6a, there are preferably three to twenty, in particular five to fifteen, peak regions 6c sitting on the height surface region $f_4$. At their highest points, the peak regions 6c each have a height $h_{max}$ (FIG. 6a), determined with respect to and perpendicular to the base level $N_B$, of 300 µm to 350 µm.

According to FIG. 2, the contrast structure 6 in the shown exemplary embodiment has trough structures 6d along the grid lines r free of positives, which make the grid pattern of the contrast structure 6, i.e. the mutual connection points of the contrast structure cells 6a, visible to the naked eye. Beginning at the latest from the height surface $F_2$ (compare FIG. 4a) on the side, facing away from the base level $N_B$, of the height surface $F_2$, the trough structures 6d have a width of at least 0.1 mm-0.05 mm on each side of the grid line r—determined perpendicular to the grid lines. The trough structures 6*d* can also have the aforementioned width "below" the height surface $F_2$, i.e. in the region between the height surface $F_2$ and the base level $N_B$, and can also run or be formed at the base level $N_B$, i.e. have the aforementioned width at the base level $N_B$.

FIG. 7*a* shows the micrograph from FIG. 2 in an oblique view, wherein the contrast structure 6 is cut open along a plane $E_1$ running parallel to the grid lines r (compare FIG. 2) and perpendicular to the base level $N_B$, wherein the plane $E_1$ does not run within one of the trough structures 6*d*, but— corresponding to the detail shown—intersects two of the trough structures 6*d* (compare FIG. 2). FIG. 7*b* shows—in enlarged form compared to FIG. 7*a*—the height profile of the contrast structure 6 in the plane $E_1$, wherein the base level $N_B$ is drawn. In the plane $E_1$, the height profile of the contrast structure 6 has a large number of successive local maxima $P_{max}$ and local minima $P_{min}$. At each local maximum $P_{max}$, the height of the contrast structure 6 determined with respect to and perpendicular to the base level $N_B$ decreases on both sides. At each local minimum $P_{min}$, the height of the contrast structure 6 increases on both sides. In the plane $E_1$, a local minimum $P_{min}$ alternately follows a local maximum $P_{max}$ several times. Between each local minimum $P_{min}$ and the two immediately adjacent local maxima $P_{max}$, there is a height difference $\Delta h$ of 80 μm to 300 μm. Particularly preferred are local minima $P_{min}$ and adjacent local maxima $P_{max}$ between which the height difference $\Delta h$ is at least 100 μm, preferably at least 150 μm. The contrast structure 6 preferably has a height profile with such local minima $P_{min}$ and adjacent local maxima $P_{max}$ in each plane perpendicular to the base level $N_B$, which does not run exclusively through a trough structure 6*d*.

According to an alternative embodiment, the grid pattern of the contrast structure 6 is not visible to the naked eye. This is achieved by omitting trough structures 6*d* and smooth transitions of peak and trough structures between contrast structure cells 6*a*.

The invention is not limited to the exemplary embodiment described.

The contrast structure cells in plan view may have a shape that deviates from the square shape described. Preferably, the contrast structure cells are each bounded by a number of straight edges in plan view. Particularly preferably, the contrast structure cells have the shape of rectangles, in particular squares, or hexagons, in particular regular hexagons. Considered in plan view, the contrast structure cells of the contrast structure are transferable into one another by at least one congruence mapping. The congruence mappings include, in a known manner, reflections (more precisely point reflections and perpendicular axis reflections, but not circle reflections and oblique reflections), rotations, parallel displacements (translations) and sliding reflections (thrust reflections). Therefore, contrast structure cells can also be provided, which can be transferred into each other by executing a plurality of different congruence mappings.

LIST OF REFERENCE SIGNS

1 . . . Sidewall
2 . . . Surface element
3 . . . Edge of the tread
4 . . . Outer bead region
5 . . . Lettering
6 . . . Contrast structure
6*a* . . . Contrast structure cell
6*b* . . . Peak and trough structure

6*c* . . . Peak region
6*d* . . . Trough structure
$E_1$ . . . Plane
$F_1, F_2, F_3, F_4$ . . . Height surface
$f_1, f_2, f_3, f_4$ . . . Height surface region
$h_1, h_2, h_3, h_4, h_{max}$ . . . Height
$\Delta h$ . . . Height difference
1 . . . Edge length
$N_B$ . . . Base level
$P_{min}$ . . . Local minimum
$P_{max}$ . . . Local maximum
r . . . Grid line
$s_1, s_2, s_3, s_4$ . . . Sectional surface

The invention claimed is:

1. A pneumatic tire for a vehicle, the tire comprising:
at least one surface element formed on an outer face of the tire and has a contrast structure that contrasts with a base level and gives the surface element a roughness,
wherein the contrast structure is formed by a plurality of contrast structure cells that coincide in shape in plan view and are joined together in the form of a grid, with each contrast structure cell constituting a unit cell of the grid,
wherein the contrast structure cells have peak structures and trough structures, each of the peak and trough structures running over the contrast structure cell asymmetrically and non-uniformly when viewed in plan view, such that the peak and trough structures together form an irregular surface-covering configuration within each contrast structure cell when viewed in plan view,
wherein the peak structures further provide irregularity by changing elevations relative to the base level as the peak structures run over the contrast structure cell;
wherein, in cross-section perpendicular to the base level (NB), each contrast structure cell has a height profile with multiple local maxima (P max) at the peak structures and multiple local minima (P min) at the trough structures, wherein the height profile has at least one height difference ($\Delta h$) in a range from 80 μm to 300 μm, as measured perpendicular to the base level (NB) from a height of at least one of the local minima (P min) at a respective trough structure to a height of at least one of the local maxima (P max) at a peak structure adjacent to that respective trough structure;
wherein, when viewed in plan view, the irregular surface- covering configuration formed by the peak and trough structures in each contrast structure cell is repeated by translation congruence mapping across the grid of the contrast structure, so that the irregular surface-covering configuration within each contrast structure cell in the grid has the same orientation as each other;
wherein the contrast structure, has valleys which extend along mutual connection points of the contrast structure cells to delineate the contrast structure cells; and
wherein the contrast structure cells have an edge length measured between the valleys of 0.8 mm to 1.5 mm.
2. The tire of claim 1, wherein the contrast structure cells (6*a*), as delineated by the valleys, have the shape of rect- angles or hexagons in plan view, and the valleys have a width of at least 0.1 mm.
3. The tire of claim 1, wherein the irregular peak and trough structures (6*b*) of each contrast structure cell (6*a*) with a height surface region ($f_1$), extending over the region of the contrast structure cell (6*a*), of a first height surface ($F_1$), which extends parallel to the base level ($N_B$) of the contrast structure (6) and, with respect thereto, lies at a height ($h_1$) of 80 µm, has a multi-part sectional surface ($s_1$), which occupies 80% to 90% of the height surface region ($f_1$).

4. The tire of claim 3, wherein the irregular peak and trough structures (6b) of each contrast structure cell (6a) with a height surface region ($f_2$), extending over the region of the contrast structure cell (6a), of a second height surface ($F_2$), which extends parallel to the base level ($N_B$) of the contrast structure (6) and, with respect thereto, lies at a height ($h_2$) of 150 µm, has a multi-part sectional surface ($s_2$), which occupies 40% to 60% of the height surface region ($f_2$).

5. The tire of claim 4, wherein the irregular peak and trough structures (6b) of each contrast structure cell (6a) with a height surface region ($f_3$), extending over the region of the contrast structure cell (6a), of a third height surface ($F_3$), which extends parallel to the base level ($N_B$) of the contrast structure (6) and, with respect thereto, lies at a height ($h_3$) of 200 µm, has a multi-part sectional surface ($s_3$), which occupies 20% to 40% of the height surface region ($f_3$).

6. The tire of claim 5, wherein the irregular peak and trough structures (6b) of each contrast structure cell (6a) with a height surface region ($f_4$), extending over the region of the contrast structure cell (6a), of a fourth height surface ($F_4$), which extends parallel to the base level ($N_B$) of the contrast structure (6) and, with respect thereto, lies at a height ($h_4$) of 280 µm, has a single-or multi-part sectional surface ($s_4$), which occupies 10% to 20% of the height surface region ($f_4$).

7. The tire of claim 6, wherein the height surface regions ($f_4$) of the fourth height surface ($F_4$) separate peak regions (6c) from the rest of the contrast structure (6), wherein up to five, peak regions (6c) sit on each height surface region ($f_4$)

and have, at their highest points, a height ($h_{max}$), determined with respect to and perpendicular to the base level (NB), of 300 µm to 350 µm.

8. The tire of claim 1, wherein the irregular peak and trough structures (6b) of each contrast structure cell (6a) with height surface regions ($f_1$, $f_2$, $f_3$, $f_4$) which extend over the region of the contrast structure cell (6a) and which belong to height surfaces ($F_1$, $F_2$, $F_3$, $F_4$) extending parallel to the base level ($N_B$) of the contrast structure (6) has, in each case, a multi-part sectional surface ($s_1$, $s_2$, $s_3$, $s_4$), wherein a first height surface ($F_1$) with respect to the base level ($N_B$) lies at a height ($h_1$) of 80 µm, a second height surface ($F_2$) with respect to the base level ($N_B$) lies at a height ($h_2$) of 150 µm, a third height surface ($F_3$) with respect to the base level ($N_B$) lies at a height ($h_3$) of 200 µm, and a fourth height surface ($F_4$) with respect to the base level ($N_B$) lies at a height ($h_4$) of 280 µm, wherein the following relationships apply:

a) size of the sectional surface ($s_4$) with the height surface region ($f_4$) of the fourth height surface ($F_4$)≤0.7×the size of the sectional surface ($s_3$) with the height surface region ($f_3$) of the third height surface ($F_3$), b) size of the sectional surface ($s_3$) with the height surface region ($f_3$) of the third height surface ($F_3$)≤0.7×the size of the sectional surface ($s_2$) with the height surface region ($f_2$) of the second height surface ($F_2$), and c) size of the sectional surface ($s_2$) with the height surface region ($f_2$) of the second height surface ($F_2$)≤0.7×the size of the sectional surface ($s_1$) with the height surface region ($f_1$) of the first height surface ($F_1$).

* * * * *